United States Patent [19]

Hayakawa

[11] Patent Number: 5,718,934
[45] Date of Patent: Feb. 17, 1998

[54] DEEP FRYING METHOD

[76] Inventor: Hideo Hayakawa, 2656-12, Moriya-ko, Moriyama-machi, Kita-soma-gun, Ibaraki-ken, Japan

[21] Appl. No.: 628,868

[22] Filed: Apr. 5, 1996

[51] Int. Cl.$^6$ ................................................ A23L 1/00
[52] U.S. Cl. ........................ 426/237; 426/244; 426/438
[58] Field of Search ................................ 426/237, 244, 426/438, 523; 99/358, DIG. 14; 219/771

[56] References Cited

U.S. PATENT DOCUMENTS

| | | |
|---|---|---|
| 4,980,530 | 12/1990 | Butot ............................................ 99/358 |
| 5,356,646 | 10/1994 | Simi-Glavaski et al. ................. 426/523 |

*Primary Examiner*—George Yeung
*Attorney, Agent, or Firm*—Nikaido Marmelstein Murray & Oram LLP

[57] ABSTRACT

The invention provides a method of deep frying coated ingredients, while giving high-frequency AC energy to frying oil or spraying water decreased in ORP value, method of suppressing degradation of the frying oil, an apparatus for giving high-frequency AC energy to the frying oil in a deep fryer, and a deep fryer which incorporates the apparatus for giving high-frequency AC energy to the frying oil. The supply of high-frequency AC energy or spraying the water decreased in ORP value suppresses an increase of acid value in the frying oil, which depends on heating period of time, and spattering of oil and/or water drops, which occurs, when the coated ingredients are dropped into the heated frying edible oil.

10 Claims, 3 Drawing Sheets

DEEP FRYING METHOD

BACKGROUND OF THE INVENTION

1. Field of the Invention

The present invention relates to an improved deep frying method and apparatus therefor, and more particularly to those, wherein deep frying working is carried out, while giving electrical energy to frying edible oil or spraying water decreased in oxidation-reduction potential (ORP) to suppress degradation of the frying oil and spattering of oil and/or water drops, when coated ingredients are dropped into the heated frying oil.

2. Related Art

When an edible oil is heated in deep frying operation on various coated ingredients, thermal oxidation will occur in the oil to cause oxidation of fatty acid component not only unsaturated one but also saturated one. Further, thermal polymerization reaction gradually occur due to free radical derived from methylene radical neighboring to double bond of the unsaturated fatty acid component, so that viscosity of the frying oil gradually increases, as the time lapses, which give bad influences on removal of excess oil from the fried food products and taste of the products, and degradation of the frying oil, such as turbidity due to residue or waste of coating material dissolved therein and like, proceeds.

Hitherto, there was no effective measure for preventing such degradation of frying oil and thus a worker selects a higher quality edible oil, controls heating temperature to keep oil temperature in a suitable range depending on kind of coated ingredient, frequently removes by a skimmer floating waste or residue derived from coating material, and exchange all of frying oils in the deep fryer to a fresh one, at relatively short period of time.

When coated ingredients are dropped into the heated frying oil, spattering of oil and/or water drops tends to occur to cause an accident of scald on hands and/or face of the the worker. Therefore, it has been said that the deep frying is one of dangerous and troublesome cookings.

SUMMARY OF THE INVENTION

Therefore, one of the objects of the invention is to provide a method of deep frying coated ingredients, which suppresses degradation of frying edible oil as long as possible.

Another object of the invention is to provide a method of deep frying coated ingredients, which suppresses spattering of oil and/or water drops, when the coated ingredients are dropped into heated frying edible oil.

Still other object of the invention is to provide an apparatus for carrying out such a method.

For overcoming the disadvantages in conventional deep frying method and attaining the objects, the inventor has energetically studied and investigated to finally hit on such a new idea that an electrical energy is given to the heated frying oil to change or modify its physical property, which trial has not ever been made.

According to the invention, therefore, the first and second objects are attained by a method of deep frying coated ingredients, which comprises steps of arranging a pair of applying electrodes and a grounding electrode in frying edible oil accommodated in a deep fryer; applying high-frequency AC voltage to the applying electrodes; heating the frying oil to a predetermined temperature; and starting frying operation of the coated ingredients.

The AC voltage may be of that converted from DC voltage. In this ease, a portable battery can be employed as an electric source, so that the method according to the invention can be carried out in any place.

The third object of the invention is attained by an apparatus comprising a pair of rod-like applying electrodes and a rod-like grounding electrode, all of said electrodes being capable of dipping into frying edible oil; a DC voltage source; first and second switches, each being connected to said DC voltage source through a variable resistor to convert DC voltage from said DC voltage source to AC voltage for alternately applying the AC voltage to one of said applying electrodes; a high-frequency switching commander circuit which is a flip-flop circuit connected to said switches through a resistor for outputting a high-frequency switching command; and a high-frequency oscillator outputting a signal to said switching commander circuit.

The apparatus may be incorporated into a deep fryer. Such a deep fryer comprises a fryer body which can accommodate frying edible oil to be heated; a pair of rod-like applying electrodes and a rod-like grounding electrode, all of said electrodes being arranged in inner space of said fryer body; a DC voltage source; first and second switches, each being connected to said DC voltage source through a variable resistor to convert DC voltage from said DC voltage source to AC voltage for alternately applying the AC voltage to one of said applying electrodes; a high-frequency switching commander circuit which is a flip-flop circuit connected to said switches through a resistor for outputting a high-frequency switching command; and a high-frequency oscillator outputting a signal to said switching commander circuit.

The apparatus and improved deep fryer may be connected to AC voltage source through an AC adapter.

When the method according to the invention is carried out and coated ingredients are dropped into frying edible oil heated at predetermined temperature depending on kind of the ingredients, spattering of oil and/or water drops has been remarkably suppressed or prevented and such a phenomenon has been recognized that an amount of bubbles generated by dropping the coated ingredients into the frying oil is far larger than that in conventional frying method which is carried out without giving high-frequency AC energy to the frying oil. According to the invention, further, thermal oxidation and polymerization of the frying oil are remarkably suppressed and removal of excess oil from fried foods is made quickly and smoothly, and thus period of time required for exchanging the waste frying oil into fresh oil can be made longer and consumption amount of the frying oil decreases.

It has been estimated that such advantages according to the method of the invention can be obtained by a decrease in ORP value due to high-frequency AC energy given to the frying oil, although measurement of ORP in the frying oil is impossible, since the oil has high temperature.

Under such an estimation, the inventor has tried such tests, wherein waters with various ORP values were prepared according to a process and apparatus as disclosed in his printed U.S. specification (U.S. Pat. No. 5,435,894) and frying operations of coated ingredients were carried out, while spraying such a water on upper surface of the heated frying oil layer in a deep fryer. As a result, he has confirmed facts that the sprayed water is momentarily vaporized without cause any spattering and that effects similar to the above can be obtained, when the water with ORP value not higher than 200 mV was sprayed. The water with low ORP value may, therefore, be referred to hereinafter as "modified water". There Is no limitation on lower limit value in ORP, but water with ORP value of −100—−200 mV is preferable in view point of its practical preparation.

Therefore, the invention also includes a method comprising a step of deep frying coated ingredients in heated frying edible oil, while spraying water with ORP value not higher than 200 mV on upper surface of the heated edible oil, to attain the first and second objects.

Further, it has been found that, if the modified water is sprayed on hot frying oil layer in the deep fryer at the time of end of frying working in each day, floating and suspending residue or waste of coating material precipitates and acid value of the frying oil can be kept in lower level of about 2 in long period of time, which means degradation of the frying oil is remarkably suppressed to make an interval of frying oil exchange longer.

Therefore, according to still other method of the invention, water decreased in ORP value is sprayed on upper surface of hot frying oil layer, at the time of end of frying working in each day to suppress degradation thereof over long period of time.

DESCRIPTION OF THE PREFERRED EMBODIMENTS

A deep frying method and apparatus according to the invention will now be further explained in more detail with Examples, Test Examples and with reference to the drawings.

Figure 1:
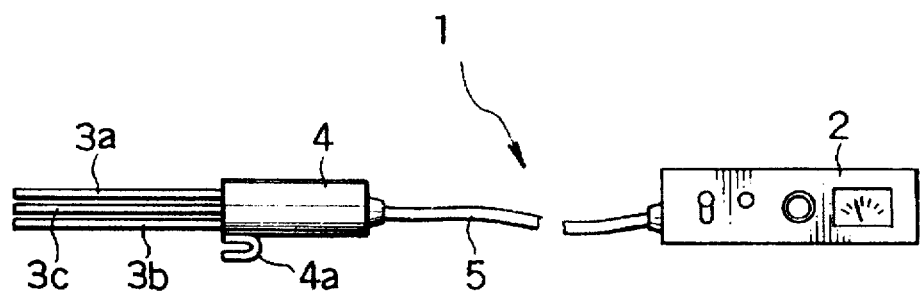
FIG. 1 is a front elevational view of an apparatus according to the invention, a part of an electric cable being omitted from illustration.

FIG. 1 shows an apparatus 1 according to the invention, which has a control box 2 to be connected to DC voltage source or AC voltage source through an AC adapter (not shown) and a grip 4 stationary connecting a pair of rod-like applying electrodes 3a, 3b and a rod-like grounding electrode 3c.

Each of the electrodes 3a, 3b and 3c are made of stainless steel, and triangularly and parallel arranged with one another. These three electrodes are stationary connected by the grip 4 made of a synthetic resin material having adiabatic property, thermostability and electrical insulation property. At front end of the grip 4, there is provided a hook 4a, so that the grip can be set to upper edge of a deep fryer (not shown) to dip the electrodes in frying oil accommodated in the fryer.

The grip 4 and control box 2 are connected by a thermostable and electrical insulating cable 5 which coats three leading wires, each of which is connected with one end to one of the electrodes 3a, 3b and 3c and with the other end to a circuit in the control box 2.

Figure 2:
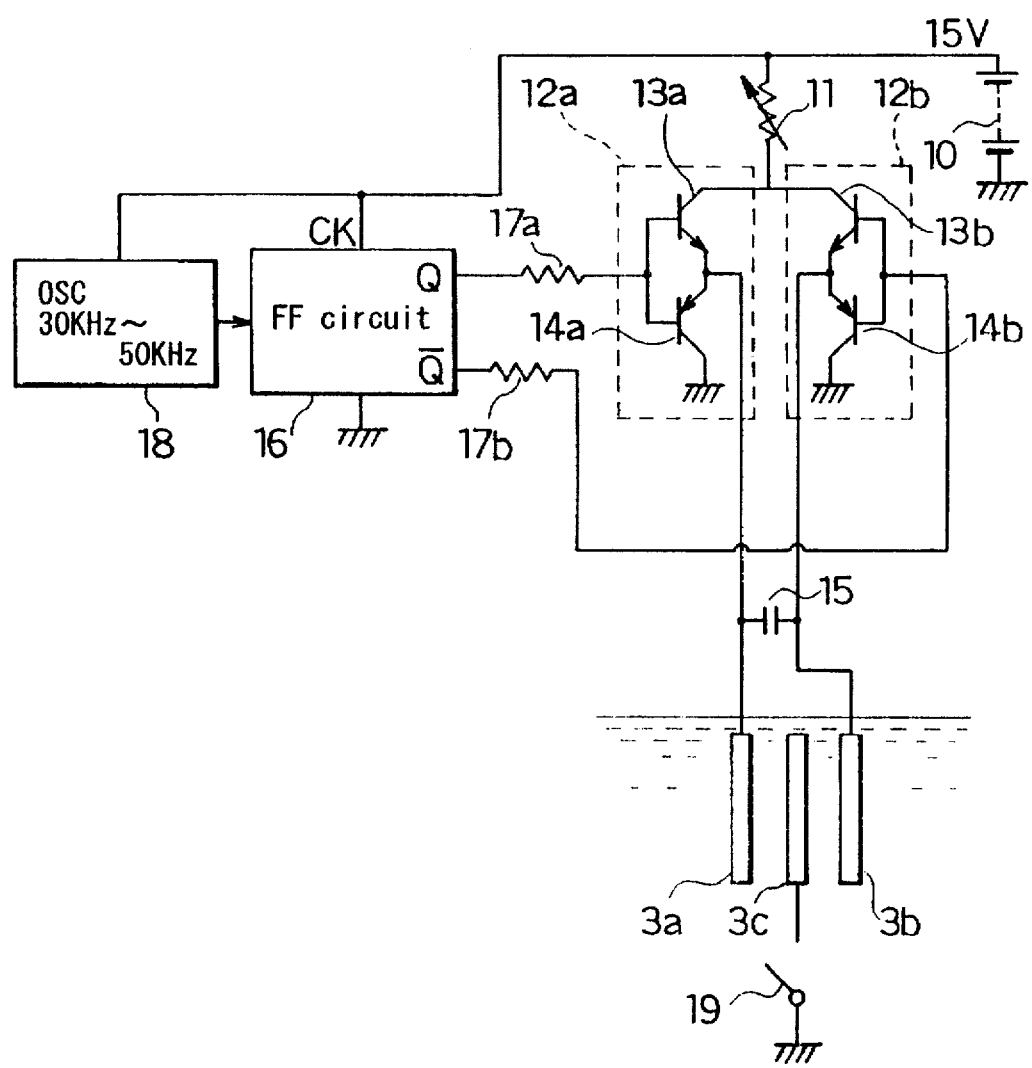
FIG. 2 is a circuit diagram for the apparatus as shown in FIG. 1.

In FIG. 2, there Is shown a circuit diagram for the apparatus shown in FIG. 1. Between a DC voltage source 10 arranged out of the control box 2 and applying electrodes 3a and 3b, there is connected a first and second high-frequency switches 12a and 12b through a variable resistor 11, which switches convert DC voltage from the DC voltage source 10 into high-frequency AC voltage for alternately supplying the AC voltage to one of the applying electrodes 3a and 3b. These first and second high-frequency switches have transistors 13a and 14a as well as 13b and 14b, respectively. The applying electrodes 3a and 3b are connected through a capacitor 15.

To the first and second high-frequency switches 12a and 12b, a high-frequency switching commander circuit 16 consisting of a flip-flop circuit is connected through resistors 17a and 17b for giving a high-frequency switching command to the high-frequency switches 12a and 12b, and a high-frequency oscillator 18 is connected to the high-frequency switching commander circuit 16. The grounding electrode 3c is grounded through a switch 19.

The deep frying method according to the invention using the apparatus 1 shown in FIG. 1 is carried out by setting the hook 4a to upper edge of the deep fryer to dip the rod-like electrodes into frying edible oil accommodated in the fryer, while heating the frying oil, turning ON the switch of control box 2 for giving high-frequency AC energy to the frying oil through the applying electrodes 3a and 3b, and then starting deep frying working of coated ingredients in a manner known per se, when temperature of the frying oil has reached to a level suitable for selected coated ingredient. Continuous operation of the apparatus 1 is not always required and thus the electric source for the apparatus may be turned OFF, after a predetermined period of time has lapsed by using a timer (not shown) or manual operation, or repeating OFF and ON operation, depending on period of time required for frying out all of the coated ingredients.

Figure 3:
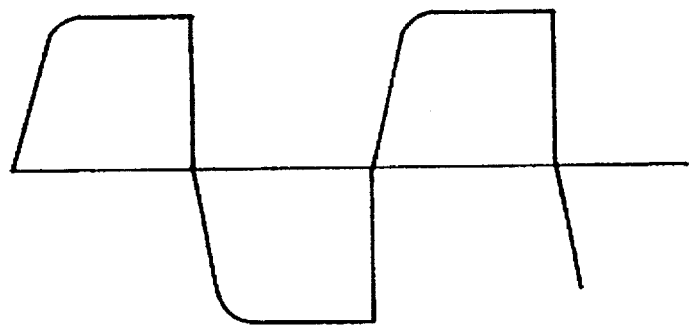
FIG. 3 shows a wave form of high-frequency AC voltage to be supplied to an applying electrode of the apparatus shown in FIGS. 1 and 2.

When the switch of the control box 2 is turned ON, a substantially rectangular high-frequency voltage wave as shown in FIG. 3 is formed by the first and second high-frequency switches 12a and 12b, which is alternately supplied to the applying electrodes 3a and 3b.

Figure 4:
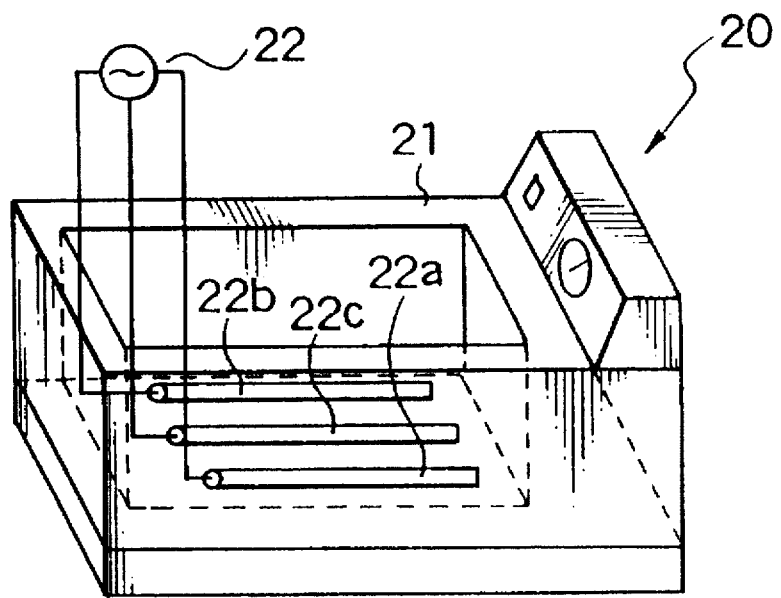
FIG. 4 is a vertical section of another embodiment of apparatus according to the invention, in which high-frequency AC energy charging means is incorporated in a deep fryer.

FIG. 4 shows another embodiment of the apparatus according to the invention, in which high-frequency AC energy charging device is incorporated in a conventional type deep fryer. This apparatus 20 comprises a fryer body 21 accommodating frying edible oil (not shown) and the high-frequency AC energy charging device 22 which is schematically illustrated. The high-frequency AC energy charging device has a pair of rod-like applying electrodes 22a and 22b as well as a rod-like grounding electrode 22c arranged between the applying electrodes. All of the electrodes are made of stainless steel and arranged in inner space of the fryer body 21 to be dipped in the frying oil, when the apparatus shall be operated.

The operation of the apparatus 20 is substantially same with that described in connection with the first embodiment shown in FIGS. 1 to 3 and thus expression thereof is omitted here.

EXAMPLE 1 AND TEST EXAMPLE 1

Method according to the invention:

An electric heating type deep fryer for Tempura cooking (Type PC-1000 and made by Zojirushi Vacuum Bottle Co., Ltd. of Japan) was used. A batter for Tempura cooking was prepared by dissolving 100 g of wheat flour into 160 ml of city water.

To the fryer, 400 ml of marketed Tempura oil were charged and the hook 4a of the apparatus 1 shown in FIG. 1 was set to upper edge of the fryer to dip the electrodes 3a, 3b and 3c in the oil. A switch of the fryer was turned ON to electrically heat the oil. By the way of heating the oil, another switch provided to the control box 2 of the apparatus 1 was also turned ON to charge high-frequency AC energy to the oil. At the time of that oil temperature had reached to about 170° C., ingredients of cut piece of cuttlefish (total weight: 1 kg) coated with the batter were gradually dropped into the heated oil to start deep frying working in a manner known per se to obtain cuttlefish Tempura foods.

Control (conventional) method:

Frying treatment was carried out in the conditions same with the above, excepting that the apparatus 1 was not set to the deep fryer, to obtain Tempura foods.

Differences in results:

Following differences were recognized.

(a) A remaining amount of oil in the fryer was 160 ml in the case of the Control (conventional) method, but 190 ml in the method according to the invention. This means that removal of excess oil from the fried products in the method according to the invention is better than that In the Control method.

(b) In the conventional method, spattering of oil and/or water drops occurred when each of the coated ingredients was dropped into the frying oil and it reached to a level of face of the worker. While, in the case of the method according to the invention, level of spattering did not reach to hands of the worker and thus he did not feel any danger. When the coated ingredients were dropped in the frying oil, bubbles had generate and an amount thereof in the case of the method according to the invention is far large than that in the conventional method.

(c) After finished the deep frying operation, an oxidation degree of the frying oil was checked by a thermal degradation tester on oils ["Abtester AV-1" (Trademark) and made by Shibata Scientific Machlne Industry Co., Ltd. of Japan]. The oxidation degree of the oil carried out the Control conventional method was a value of 1 or more, but the oil carried out the method according to the Invention was a value of less than 1. In connection with this, please note that the tester has only 2 indications in graduation of "1 or more" and "less than 1".

(d) The frying oil carried out the method according to the invention had a light color tone and high transparency, in comparison with those of the frying oil carried out the conventional method.

(e) Visual appearance of the fried foods obtained by the method according to the invention had more white color tone than those of the foods obtained by the conventional method. It means that an amount of the oil contained in the coating of foods obtained by the method according to the invention is more less than that in the coating of foods obtained by the conventional method. Further, taste check of the fried foods obtained by the conventional method showed somewhat watery feeling and coating had peeled off, as the time lapses. On the contrary thereto, the fried foods obtained by the method according to the invention showed nice and somewhat hard tooth feeling and did not occur any peeling off of the coating, even though the products were left to stand, as it were.

TEST EXAMPLE 2

Refined soy bean oil for business use was charged in a deep fryer and heated to 180° C. to measure viscosity thereof. Thereafter, the heated oil was continuously kept at 180° C. for 35 hours, as testing period of time, while spraying the modified water with ORP value of −100 mV (25 g/100 g oil/hour) and adding fresh oil [10% (V/V)/7 hours], in sometimes. During the testing period of time, viscosity thereof was measured by further 5 times with an interval of 7 hours and a viscosity increasing rate was calculated based on the value of the first measured viscosity.

Figure 5:
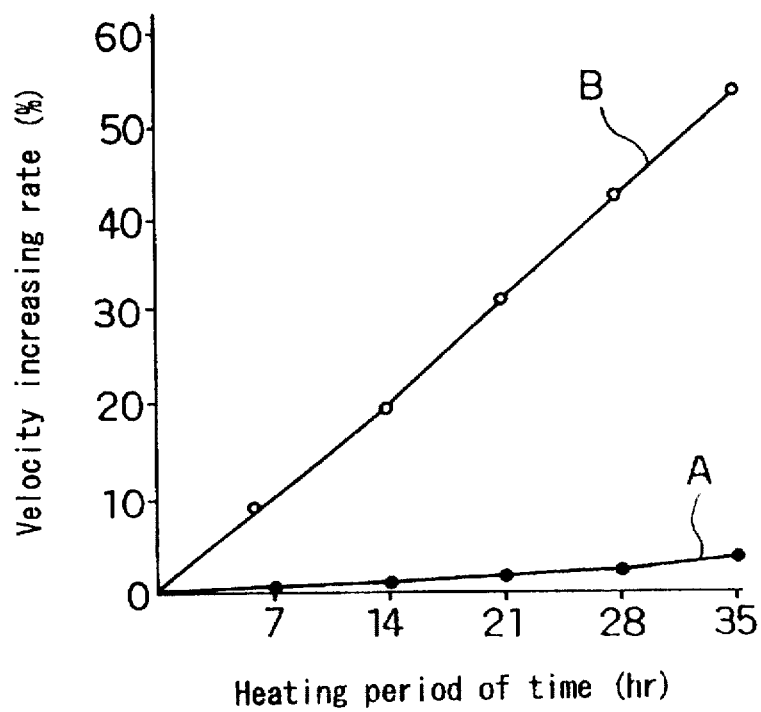
FIG. 5 is a graph showing a relation between heating period of time and viscosity increasing rate of frying oil, when the frying oil is heated at a predetermined temperature.

Results are shown in FIG. 5. As apparently from curve A therein, increase in viscosity was about 3% only during the testing period of time, when the modified water was sprayed on upper surface of the heated oil layer (The spraying did not cause any spattering of oil and/or water drops). On the contrary thereto, increase in viscosity became more than 50%, in a Control case of that no modified water was sprayed (see curve B in the Figure).

This means that the modified water has an effect for suppressing thermal polymerization reaction in the oil to inhibit degradation thereof.

EXAMPLE 2 AND TEST EXAMPLE 3

Method according to the invention:

Following device and materials were set.

1) Spraying vessel accommodating the modified water with ORP value of −200 mV
2) Deep fryer for business use
3) Salad oil
4) Ingredients; sliced pork meats (50 pieces, about 100 g/piece) and shrimps (80 tails, middle size)
5) Seasonings; salt and pepper
6) Coating materials; wheat flour, egg and bread crumb To the fryer, 6.8 liters of salad oil were charged and heated to 180° C. Then several coated pork fillets or shrimp tails were dropped into the frying oil. After taken out resulting fried products and removed by a skimmer floating residue or waste due to the coating materials, the modified water was sprayed in several times, on upper surface of the frying oil layer in the fryer, and then re-start the frying operation. Such cycle was repeated, until all of the coated ingredients were fried out.

Control (conventional) method:

The above working was carried out in the conditions same with the above, excepting that among the ingredients, number of shrimps were 60 tails and the modified water was not sprayed on the frying oil layer.

Differences in results:

(a) During the frying working by the method according to the invention, oil samples was taken by 8 times before and after the modified water spraying operation for measuring acid value of the oil in accordance with a standard oil analytical method to obtain mean acid value of 0.42. While, oil samples being carried out the Control conventional method showed mean acid value of 0.55.

(b) Each of the remaining frying oil was filtered by a stainless steel sieve (distance between wires: 105 μm). Passing velocity of the oil used for the method according to the invention was higher than that of the oil used for the conventional method.

(c) In the conventional method, spattering of oil and/or water drops occurred, when each of the coated ingredients was dropped into the frying oil and it reached to a level of face of the worker, but in the case of the method according to the invention, it did not occur. When the coated ingredients were dropped into the frying oil, bubbles had generate and an amount thereof in the case of method according to the invention is far large than that in the conventional method.

(d) The frying oil carried out the method according to the invention had a lighter color tone and transparency, in comparison with that of the frying oil carried out the conventional method.

(e) Visual appearance of the fried shrimp products obtained by the method according to the invention had more whity color tone than that of the products obtained by the conventional method.

EXAMPLE 3 AND TEST EXAMPLE 4

To more verify the experimentally obtained effects of the method according to the invention, further experiments were carried out in an actual Restaurant and a Special Shop on fried pork cutlets, who use refined soy bean oil for business use (the food of "fried pork cutlet" is cooked by coating a sliced pork meat with wheat flour, dipping the coated meat in egg solution, further coating the same with bread crumb, and then deep frying the coated meat in heated frying oil).

Frying conditions and others in both places prior to the Experiments are as follows.

In the Restaurant:

1) Kinds and number of products; Various fried foods including the pork cutlets, croquettes and the like (300–400 pieces/day in total)

2) Frying temperature; 160–170° C.

3) Addition rate of fresh frying oil; 15% (V/V)/7 hours

4) Filtration of frying oil; Filtration of frying oil is carried out at the time of end of daily frying working by using a 2–3 μm filter. The filter Is exchanged to a fresh one at an Interval of several days.

In the Special Shop:

1) Number of the products; 100 pieces/day

2) Frying temperature; about 160° C.

3) Addition rate of fresh frying oil; 15% (V/V)/7 hours

4) Filtration of frying oil; Filtration of the frying oil is not carried out, but a clean type deep fryer with water layer at bottom of the fryer has been employed, and at the time of end of daily frying working, the water layer and a part of oil accumulated on the water layer (0.5–1 liter) have been drained out from the fryer and fresh bottom water layer has been formed again.

(b) Relation between acid value of frying oil and frying period of time:

Under the conditions and the like given in said Item (a), frying working was continued for five days and acid value of the used frying oil was measured at the time of end of frying working in each day.

Figure 6:
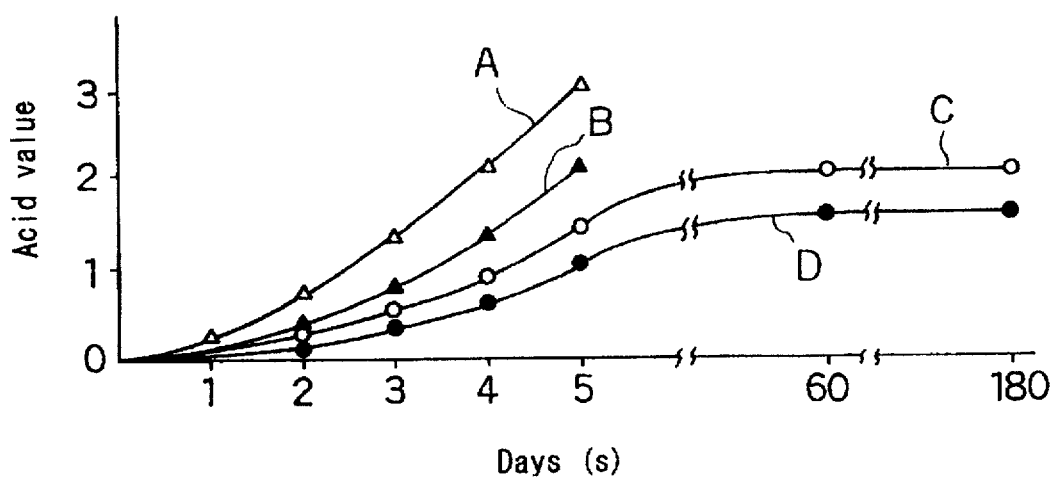
FIG. 6 is a graph showing a relation between frying period of time and acid value of frying oil.

Results are shown in FIG. 6 as curves C (Restaurant) and D (Special Shop).

It has been said in this field that if acid value of the frying oil reaches to 2.5–3, smoke emitting temperature of the oil decreases to 170°–160° C. and thus the acid value can be made as an index on degradation of frying oils. Therefore, if the acid value has reached to 3, the worker usually exchanges all frying oils in the fryer to fresh one, in order to keep quality of his fried products in reasonable level.

When the above matter has been taken into consideration, it is apparent from the curves C and D in FIG. 6 that in the case of the Restaurant, the frying oil in the fryer should be exchanged with an interval of five days, and in the case of the Special Shop, an interval therefor is about seven days.

(c) Experiments and Results

Frying workings in the Restaurant and Special Shop were carried out under the following condition, in addition to the conditions and others given in said Item (a), excepting that addition rate of fresh oil was changed from 15% (V/V) to 10% (V/V)/7 hours, since in this case, consumption amount of the frying oil could be saved.

The modified water with ORP value of −100 mV was sprayed on upper surface of hot frying oil layer at the time of end of frying working in each day and then frying oil in the fryer was filtered in the case of Restaurant or water and accumulated oil layers were drained out from the fryer in the case of Speciality Store.

Results are shown in FIG. 6 as curves E (Restaurant) and F (Speciality Store). As apparently seen therefrom, there was required no frying oil exchange over 180 days, since acid value did not reach to the critical point of 3 and had been kept to about 2.

The above facts means that thermal degradation of frying oil can be remarkably suppressed by spraying the modified water.

What is claimed is:

1. A method of deep frying coated ingredients, which comprises the steps of:

arranging a pair of applying electrodes and a grounding electrode in frying edible oil accommodated in a deep fryer;

supplying high-frequency AC voltage to the applying electrodes;

heating the frying edible oil to a predetermined temperature; and deep frying the coated ingredients.

2. A method as claimed in claim 1, further comprising the step of intermittently spraying water decreased in oxidation-reduction potential not higher than 200 mV on an upper surface of a heated frying oil layer during frying.

3. A method as claimed in claim 2, wherein the oxidization-reduction potential value is not higher than −100 mV.

4. A method as claimed in claim 1, further comprising the step of spraying water decreased in oxidation-reduction potential not higher than 200 mV on an upper surface of a hot frying oil layer, at a time of an end of daily frying.

5. A method as claimed in claim 4, wherein the oxidation-reduction potential value is not higher than −100 mV.

6. A method of deep frying coated ingredients, which comprises the steps of:

providing a pair of applying electrodes and a grounding electrode in frying edible oil accommodated in a deep fryer;

connecting first and second switches respectively to a DC voltage source through a variable resistor;

connecting a switching commander circuit which is a flip-flop circuit to the switches through a resistor;

connecting an oscillator to the switching commander circuit:

alternately outputting a switching command by the switching commander circuit to the first and second switches, so that the first and second switches are periodically turned ON and OFF:

alternately applying voltage to the pair of applying electrodes;

heating the frying edible oil to a predetermined temperature; and deep frying the coated ingredients.

7. A method as claimed in claim 6, further comprising the step of intermittently spraying water decreased in oxidation-reduction potential not higher than 200 mV on an upper surface of a heated frying oil layer during frying.

8. A method as claimed in claim 7 wherein the oxidization-reduction potential value is not higher than −100 mV.

9. A method as claimed in claim 6, further comprising the step of spraying water decreased in oxidation-reduction potential not higher than 200 mV on an upper surface of a hot frying oil layer, at a time of an end of daily frying.

10. A method as claimed in claim 9, wherein the oxidation-reduction potential value is not higher than −100 mV.

* * * * *

UNITED STATES PATENT AND TRADEMARK OFFICE
CERTIFICATE OF CORRECTION

PATENT NO. : 5,718,934

DATED : February 17, 1998

INVENTOR(S) : Hayakawa

It is certified that error appears in the above-identified patent and that said Letters Patent is hereby corrected as shown below:

The tile page,

Item [76], line 2, delete "Moriyama-machi" insert therefor -

-- Moriya-machi --.

Signed and Sealed this

Twelfth Day of May, 1998

Attest:

BRUCE LEHMAN

*Attesting Officer*            *Commissioner of Patents and Trademarks*